United States Patent
Gilbreth et al.

(10) Patent No.: US 6,612,112 B2
(45) Date of Patent: Sep. 2, 2003

(54) TRANSIENT TURBINE EXHAUST TEMPERATURE CONTROL FOR A TURBOGENERATOR

(75) Inventors: Mark Gilbreth, Simi Valley, CA (US); Joel Wacknov, Thousand Oaks, CA (US); Simon Wall, Thousand Oaks, CA (US); Ed Edelman, Agoura Hills, CA (US)

(73) Assignee: Capstone Turbine Corporation, Chatsworth, CA (US)

(*) Notice: Subject to any disclaimer, the term of this patent is extended or adjusted under 35 U.S.C. 154(b) by 0 days.

(21) Appl. No.: 10/012,770

(22) Filed: Nov. 5, 2001

(65) Prior Publication Data

US 2002/0121091 A1 Sep. 5, 2002

Related U.S. Application Data (63) Continuation-in-part of application No. 09/207,817, filed on Dec. 8, 1998, now Pat. No. 6,487,096.
(60) Provisional application No. 60/245,829, filed on Nov. 3, 2000.

(51) Int. Cl.[7] .................................................. F02C 9/28
(52) U.S. Cl. ....................................... 60/773; 60/39.281
(58) Field of Search ............................... 60/39.281, 773

(56) References Cited

U.S. PATENT DOCUMENTS

| | | |
|---|---|---|
| 2,864,244 A | 12/1958 | Prachar |
| 3,124,924 A | 3/1964 | Smith |
| 3,250,973 A | 5/1966 | Dawson |
| 3,569,809 A | 3/1971 | Comer |
| 3,591,844 A | 7/1971 | Schonebeck et al. |
| 3,703,076 A | 11/1972 | Hagemeister |
| 3,724,214 A | 4/1973 | Bryant |
| 3,764,815 A | 10/1973 | Habock et al. |
| 3,809,914 A | 5/1974 | Kilgore et al. |
| 3,829,758 A | 8/1974 | Studtmann |
| 3,937,974 A | 2/1976 | Lafuze |
| 3,991,357 A | 11/1976 | Kaminski |
| 4,005,581 A | 2/1977 | Aanstad |
| 4,015,187 A | 3/1977 | Sasaki et al. |
| 4,039,914 A | 8/1977 | Steigerwald et al. |
| 4,093,869 A | 6/1978 | Hoffmann et al. |
| 4,119,861 A | 10/1978 | Gocho |
| 4,258,424 A | 3/1981 | Giras et al. |
| 4,265,099 A | 5/1981 | Johnson et al. |
| 4,292,534 A | 9/1981 | Diegel et al. |
| 4,340,820 A | 7/1982 | Meyer-Pittroff et al. |

(List continued on next page.)

FOREIGN PATENT DOCUMENTS

| | | |
|---|---|---|
| DE | 3634328 A1 | 4/1987 |
| EP | 0 472 294 A1 | 2/1992 |
| EP | 0 679 800 A2 | 11/1995 |
| EP | 0 837 231 A2 | 4/1998 |
| EP | 0 901 218 A2 | 3/1999 |
| WO | WO 94/27359 | 11/1994 |
| WO | WO 98/25014 | 6/1998 |
| WO | WO 99/32762 | 7/1999 |
| WO | WO 99/52193 | 10/1999 |
| WO | WO 00/28191 | 5/2000 |

*Primary Examiner*—Louis J. Casaregola
(74) *Attorney, Agent, or Firm*—Sterne, Kessler, Goldstein & Fox P.L.L.C.

(57) ABSTRACT

A turbogenerator is controlled by a temperature loop that provides fuel to the combustor to maintain a desired turbine exhaust temperature, and by a speed control loop that controls the speed of the turbogenerator to provide a desired power output. When the desired power output is reduced, the turbogenerator speed is reduced accordingly, and the desired turbine exhaust temperature is increased temporarily to maintain sufficient fuel flow to the combustor to prevent combustor flame-out.

6 Claims, 7 Drawing Sheets

U.S. PATENT DOCUMENTS

| | | |
|---|---|---|
| 4,401,938 A | 8/1983 | Cronin |
| 4,442,385 A | 4/1984 | Van Sickle |
| 4,471,229 A | 9/1984 | Plohn et al. |
| 4,481,459 A | 11/1984 | Mehl et al. |
| 4,498,551 A | 2/1985 | Arbisi |
| 4,551,980 A | 11/1985 | Bronicki |
| 4,560,364 A | 12/1985 | Cohen |
| 4,565,957 A | 1/1986 | Gary et al. |
| 4,684,814 A | 8/1987 | Radomski |
| 4,686,379 A | 8/1987 | Ohnari |
| 4,709,318 A | 11/1987 | Gephart et al. |
| 4,719,550 A | 1/1988 | Powell et al. |
| 4,730,397 A | 3/1988 | Weiford et al. |
| 4,754,607 A | 7/1988 | Mackay |
| 4,757,686 A | 7/1988 | Kawamura et al. |
| 4,772,802 A | 9/1988 | Glennon et al. |
| 4,786,852 A | 11/1988 | Cook |
| 4,802,882 A | 2/1989 | Heidrich |
| 4,830,412 A | 5/1989 | Raad et al. |
| 4,833,887 A | 5/1989 | Kawamura et al. |
| 4,841,216 A | 6/1989 | Okada et al. |
| 4,862,009 A | 8/1989 | King |
| 4,883,973 A | 11/1989 | Lakey et al. |
| 4,908,565 A | 3/1990 | Cook et al. |
| 4,939,441 A | 7/1990 | Dhyanchand |
| 4,955,199 A | 9/1990 | Kawamura |
| 4,967,096 A | 10/1990 | Diemer et al. |
| 4,968,926 A | 11/1990 | Dhyanchand |
| 4,982,569 A | 1/1991 | Bronicki |
| 5,013,929 A | 5/1991 | Dhyanchand |
| 5,015,941 A | 5/1991 | Dhyanchand |
| 5,029,062 A | 7/1991 | Capel |
| 5,038,566 A | 8/1991 | Hara |
| 5,055,764 A | 10/1991 | Rozman et al. |
| 5,057,763 A | 10/1991 | Torii et al. |
| 5,068,590 A | 11/1991 | Glennon et al. |
| 5,088,286 A | 2/1992 | Muraji |
| 5,097,195 A | 3/1992 | Raad et al. |
| 5,115,183 A | 5/1992 | Kyoukane et al. |
| 5,158,504 A | 10/1992 | Stocco |
| 5,191,520 A | 3/1993 | Eckersley |
| 5,214,371 A | 5/1993 | Naidu |
| 5,237,260 A | 8/1993 | Takakado et al. |
| 5,250,890 A | 10/1993 | Tanamachi et al. |
| 5,252,860 A | 10/1993 | McCarty et al. |
| 5,260,637 A | 11/1993 | Pizzi |
| 5,281,905 A | 1/1994 | Dhyanchand et al. |
| 5,291,106 A | 3/1994 | Murty et al. |
| 5,309,081 A | 5/1994 | Shah et al. |
| 5,325,043 A | 6/1994 | Parro |
| 5,345,154 A | 9/1994 | King |
| 5,363,032 A | 11/1994 | Hanson et al. |
| 5,364,309 A | 11/1994 | Heidrich et al. |
| 5,373,195 A | 12/1994 | De Doncker et al. |
| 5,381,081 A | 1/1995 | Radun |
| 5,387,859 A | 2/1995 | Murugan et al. |
| 5,404,092 A | 4/1995 | Gegner |
| 5,406,797 A | 4/1995 | Kawamura |
| 5,428,275 A | 6/1995 | Carr et al. |
| 5,430,362 A | 7/1995 | Carr et al. |
| 5,477,091 A | 12/1995 | Fiorina et al. |
| 5,488,286 A | 1/1996 | Rozman et al. |
| 5,495,162 A | 2/1996 | Rozman et al. |
| 5,495,163 A | 2/1996 | Rozman et al. |
| 5,510,696 A | 4/1996 | Naidu et al. |
| 5,512,811 A | 4/1996 | Latos et al. |
| 5,544,484 A | 8/1996 | Voss et al. |
| 5,545,090 A | 8/1996 | Kirschey |
| 5,546,742 A | 8/1996 | Shekhawat et al. |
| 5,550,410 A | 8/1996 | Titus |
| 5,550,455 A | 8/1996 | Baker |
| 5,559,421 A | 9/1996 | Miyakawa |
| 5,563,802 A | 10/1996 | Plahn et al. |
| 5,568,023 A | 10/1996 | Grayer et al. |
| 5,572,108 A | 11/1996 | Windes |
| 5,581,168 A | 12/1996 | Rozman et al. |
| 5,587,647 A | 12/1996 | Bansal et al. |
| 5,594,322 A | 1/1997 | Rozman et al. |
| 5,637,987 A | 6/1997 | Fattic et al. |
| 5,646,458 A | 7/1997 | Bowyer et al. |
| 5,656,915 A | 8/1997 | Eaves |
| 5,743,227 A | 4/1998 | Jacquet et al. |
| 5,767,637 A | 6/1998 | Lansberry |
| 5,789,881 A | 8/1998 | Egami et al. |
| 5,799,484 A | 9/1998 | Nims |
| 5,819,524 A | 10/1998 | Bosley et al. |
| 5,847,522 A | 12/1998 | Barba |
| 5,903,116 A | 5/1999 | Geis et al. |
| 5,905,346 A | 5/1999 | Yamada et al. |
| 5,929,537 A | 7/1999 | Glennon |
| 5,936,312 A | 8/1999 | Koide et al. |
| 5,939,794 A | 8/1999 | Sakai et al. |
| 5,946,086 A | 8/1999 | Bruce |
| 5,982,645 A | 11/1999 | Levran et al. |
| 5,998,976 A | 12/1999 | Steffan |
| 6,005,297 A | 12/1999 | Sasaki et al. |
| 6,020,713 A | 2/2000 | Geis et al. |
| 6,023,135 A | 2/2000 | Gilbreth et al. |
| 6,051,951 A | 4/2000 | Arai et al. |
| 6,054,776 A | 4/2000 | Sumi |
| 6,064,122 A | 5/2000 | McConnell |
| 6,087,734 A | 7/2000 | Maeda et al. |
| 6,107,775 A | 8/2000 | Rice et al. |
| 6,147,414 A | 11/2000 | McConnell et al. |
| 6,153,942 A | 11/2000 | Roseman et al. |
| 6,169,332 B1 | 1/2001 | Taylor et al. |
| 6,169,334 B1 | 1/2001 | Edelman |
| 6,175,210 B1 | 1/2001 | Schwartz et al. |
| 6,194,794 B1 | 2/2001 | Lampe et al. |
| 6,219,623 B1 | 4/2001 | Wills |
| 6,405,522 B1 | 6/2002 | Pont et al. |
| 6,410,992 B1 | 6/2002 | Wall et al. |

TRANSIENT TURBINE EXHAUST TEMPERATURE CONTROL FOR A TURBOGENERATOR

RELATED APPLICATIONS

This patent application is a continuation-in-part of U.S. patent application Ser. No. 09/207,817, filed Dec. 8, 1998 (U.S. Pat. No. 6,487,096), and claims the priority of provisional patent application Ser. No. 60/245,829 filed on Nov. 3, 2000.

TECHNICAL FIELD OF THE INVENTION

The invention relates to turbogenerators, and more particularly to control methods and systems for turbogenerators.

BACKGROUND OF THE INVENTION

A turbogenerator is typically operated at a steady state condition defined by certain temperature, speed, fuel flow, and other parameters selected to meet a specified power output. When the required power output drops suddenly, such as may occur when the turbogenerator is operated to meet a certain power demand and the power demand experiences a transient drop, one or more of the parameters must be adjusted accordingly to produce only the required power and, optionally, dispose of any excess power being generated. Typically, the fuel flow provided to the turbogenerator must decrease to a reduced level to sustain a lower turbogenerator speed as dictated by the new, reduced power demand. Reducing the fuel flow will also typically reduce the turbine exhaust temperature (herein after: TET). Both the fuel flow and the TET, however, are subject to the certain operating constraints. TET, for instance, cannot exceed certain values for certain periods of time without causing significant damage to the turbogenerator components. Fuel flow cannot be reduced below a certain predetermined level without causing flame-out in the turbogenerator combustor.

What is therefore needed is a method and system for transient turbogenerator control that prevents combustor flame-out.

SUMMARY OF THE INVENTION

In one aspect, the invention provides a method of controlling a turbogenerator comprising operating the turbogenerator at a selected speed to provide a selected amount of power, providing fuel to the turbogenerator to maintain a turbine exhaust temperature at a first selected value, reducing the turbogenerator speed to provide a reduced amount of power, and providing fuel to the turbogenerator to maintain the turbine exhaust temperature at a second selected value higher than the first selected value for a selected period of time.

In another aspect, the amount of fuel provided to the turbogenerator is gradually increased over the selected period of time to maintain the turbine exhaust temperature at the second selected value. In a further aspect, the turbogenerator speed is reduced to provide a reduced amount of power in response to a reduction in a power demand. A specified period of time may be allowed to lapse after the reduction in power demand prior to reducing the turbogenerator speed.

DETAILED DESCRIPTION OF THE INVENTION

Figure 1A:
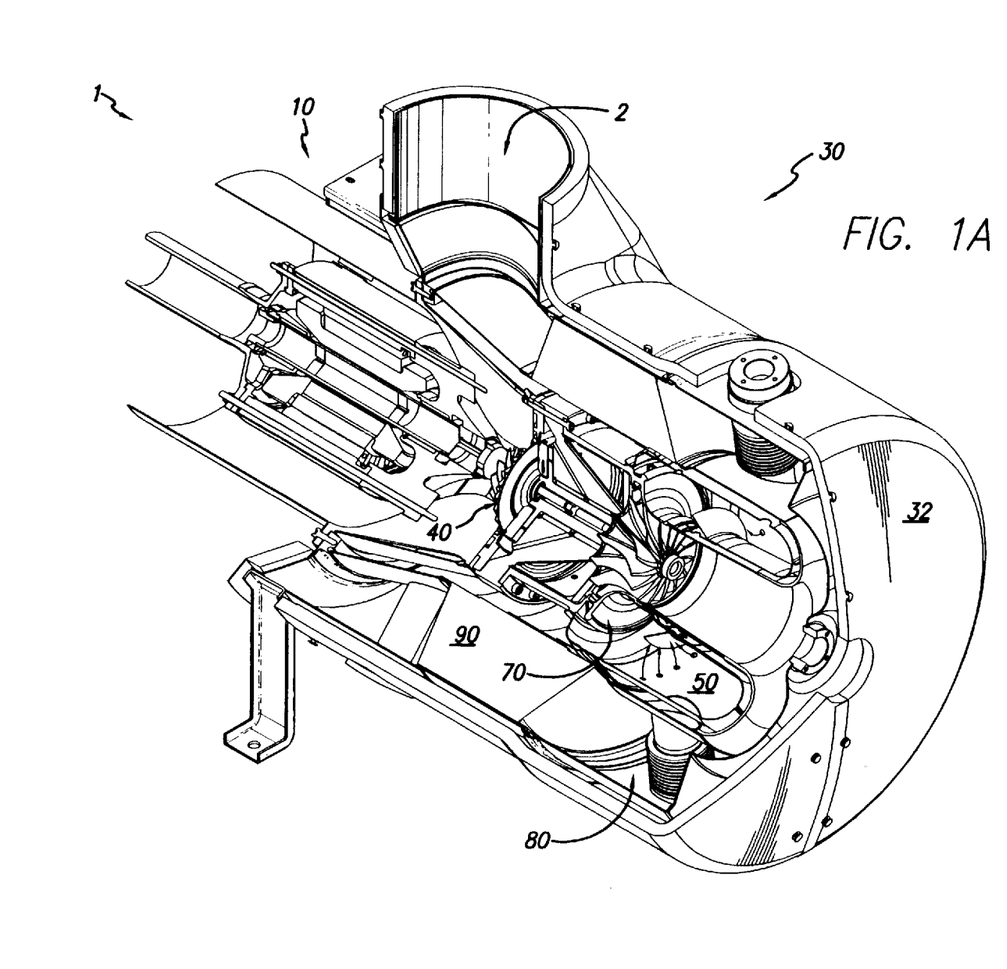
FIG. 1A is perspective view, partially in section, of an integrated turbogenerator system.

Refering to FIG. 1A, integrated turbogenerator 1 generally includes motor/generator section 10 and compressor-combustor section 30. Compressor-combustor section 30 includes exterior can 32, compressor 40, combustor 50 and turbine 70. Recuperator 90 may be optionally included.

Figure 1B:
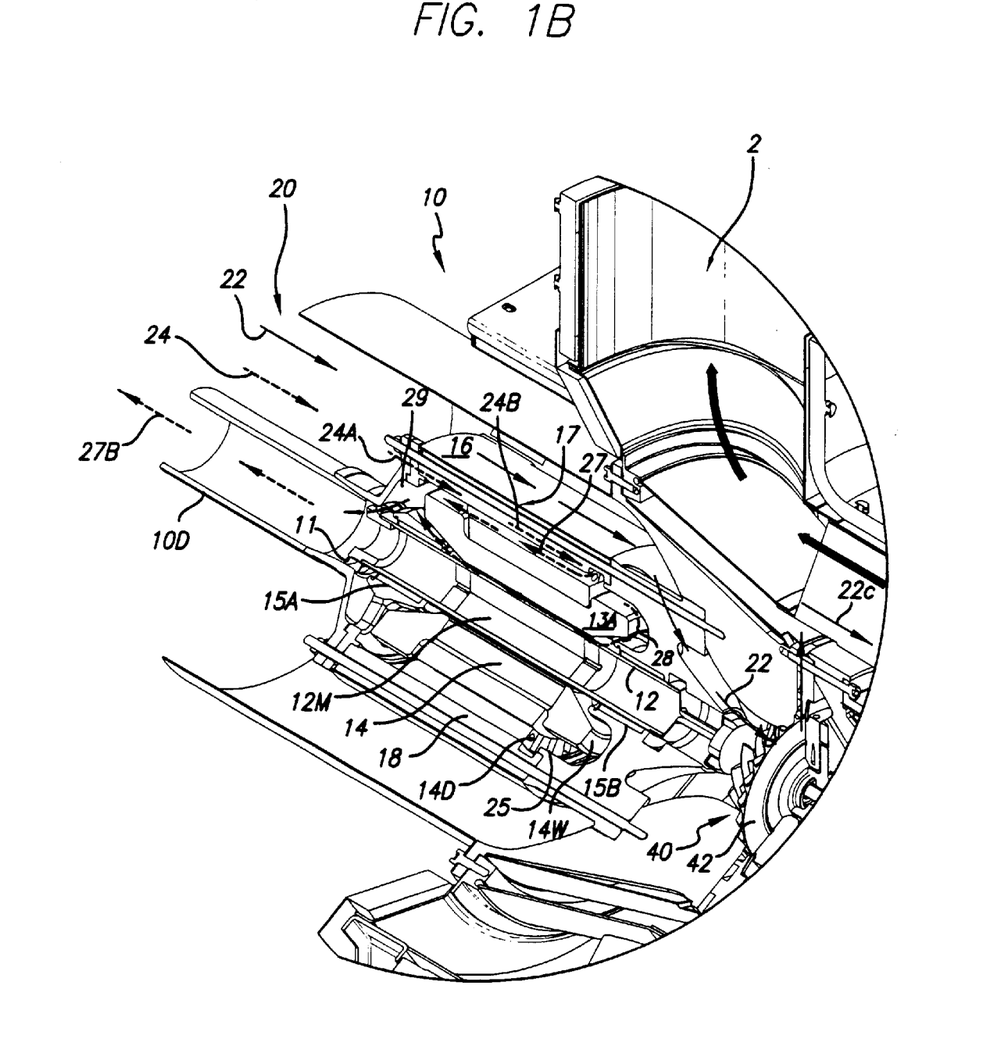
FIG. 1B is a magnified perspective view, partially in section, of the motor/generator portion of the integrated turbogenerator of FIG. 1A.
Figure 1C:
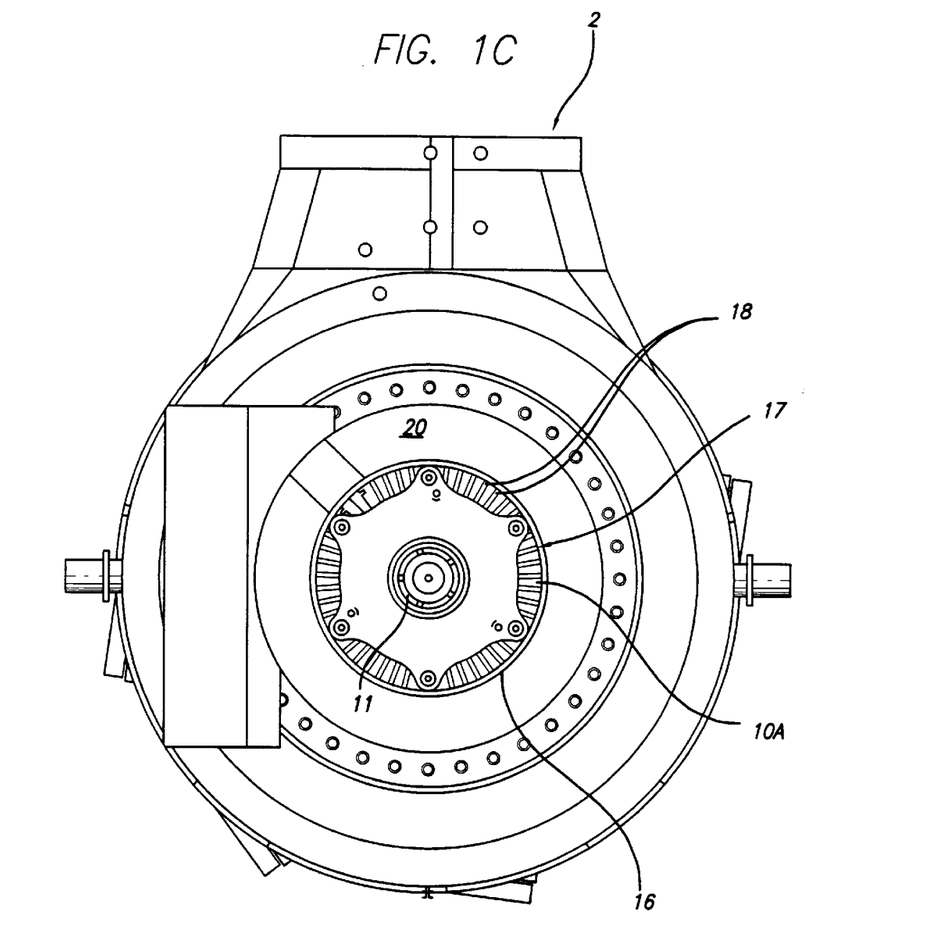
FIG. 1C is an end view, from the motor/generator end, of the integrated turbogenerator of FIG. 1A.

Referring to FIG. 1B and FIG. 1C, motor/generator section 10 may be a permanent magnet motor generator having permanent magnet rotor or sleeve 12. Any other suitable type of motor generator may also be used. Permanent magnet rotor or sleeve 12 may contain permanent magnet 12M. Permanent magnet rotor or sleeve 12 and the permanent magnet disposed therein are rotatably supported within permanent magnet motor/generator stator 14. Preferably, one or more compliant foil, fluid film, radial, or journal bearings 15A and 15B rotatably support permanent magnet rotor or sleeve 12 and the permanent magnet disposed therein. All bearings, including all thrust, radial and journal bearings, in turbogenerator 1 may be fluid film bearings or compliant foil bearings. Motor/generator housing 16 encloses stator heat exchanger 17 having a plurality of radially extending stator cooling fins 18. Stator cooling fins 18 connect to, and/or form part of, stator 14 and extend into annular space 10A between motor/generator housing 16 and stator 14. Wire windings 14W are provided on permanent magnet motor/generator stator 14.

Figure 1D:
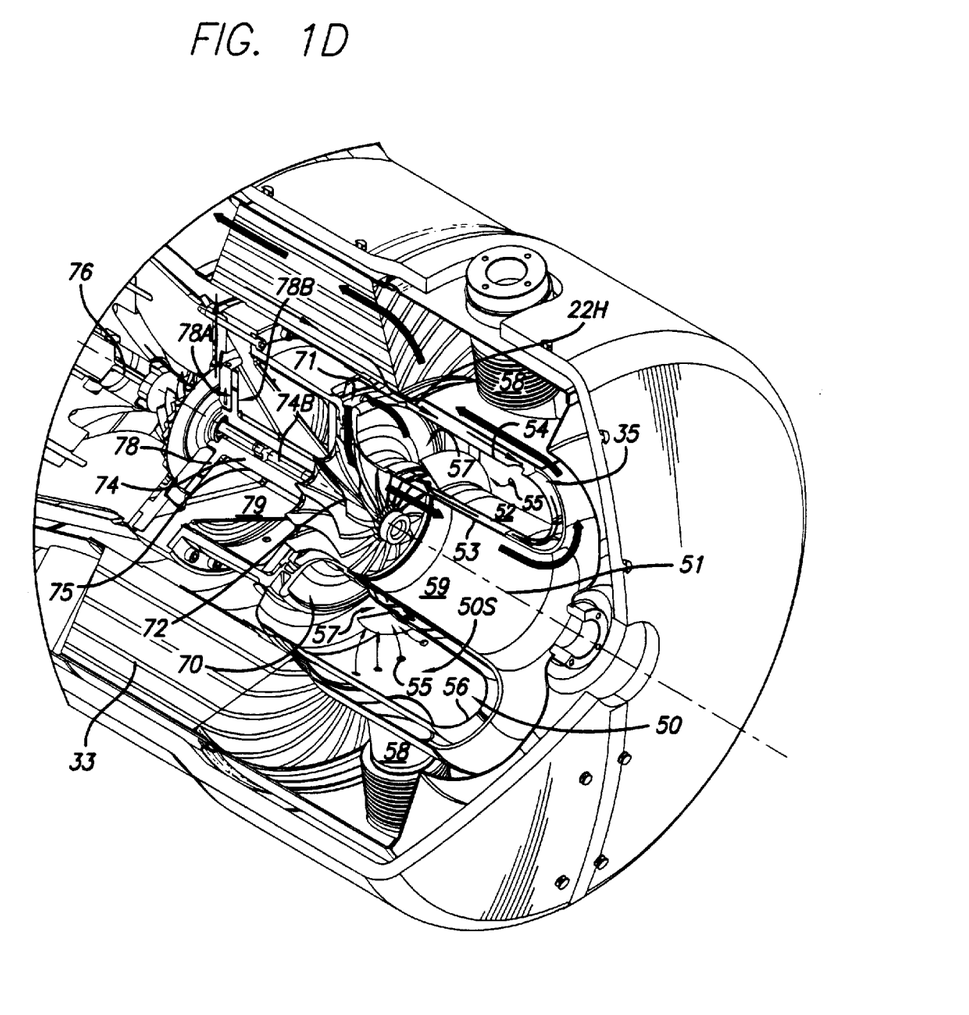
FIG. 1D is a magnified perspective view, partially in section, of the combustor-turbine exhaust portion of the integrated turbogenerator of FIG. 1A.

Referring to FIG. 1D, combustor 50 may include cylindrical inner wall 52 and cylindrical outer wall 54. Cylindrical outer wall 54 may include air inlets 55. Cylindrical walls 52 and 54 define annular interior space 50S in combustor 50 including axis 51. Combustor 50 includes generally annular wall 56 further defining one axial end of the annular interior space of combustor 50. Associated with combustor 50 may be one or more fuel injector inlets 58 to accommodate fuel injectors that receive fuel from fuel control element 50P (shown in FIG. 2), and inject fuel or a fuel air mixture to interior 50S of combustor 50. Inner cylindrical surface 53 is interior to cylindrical inner wall 52 and forms exhaust duct 59 for turbine 70.

Turbine 70 may include turbine wheel 72. An end of combustor 50 opposite annular wall 56 defines aperture 71 in turbine 70 opening toward turbine wheel 72. Bearing rotor 74 may include a radially extending thrust bearing portion such as bearing rotor thrust disk 78 constrained by bilateral thrust bearings 78A and 78B. Bearing rotor 74 may be rotatably supported by one or more journal bearings 75 within center bearing housing 79. Bearing rotor thrust disk 78 at the compressor end of bearing rotor 76 is preferably rotatably supported by bilateral thrust bearings 78A and 78B. Journal or radial bearing 75 and thrust bearings 78A and 78B may be fluid film or foil bearings.

Turbine wheel 72, bearing rotor 74 and compressor impeller 42 may be mechanically constrained by tie bolt 74B, or other suitable structure/s, to rotate therewith when turbine wheel 72 rotates. Mechanical link 76 mechanically constrains compressor impeller 42 to permanent magnet rotor or sleeve 12 and the permanent magnet disposed therein, causing permanent magnet rotor or sleeve 12 and the permanent magnet disposed therein to rotate when compressor impeller 42 rotates.

Figure 1E:
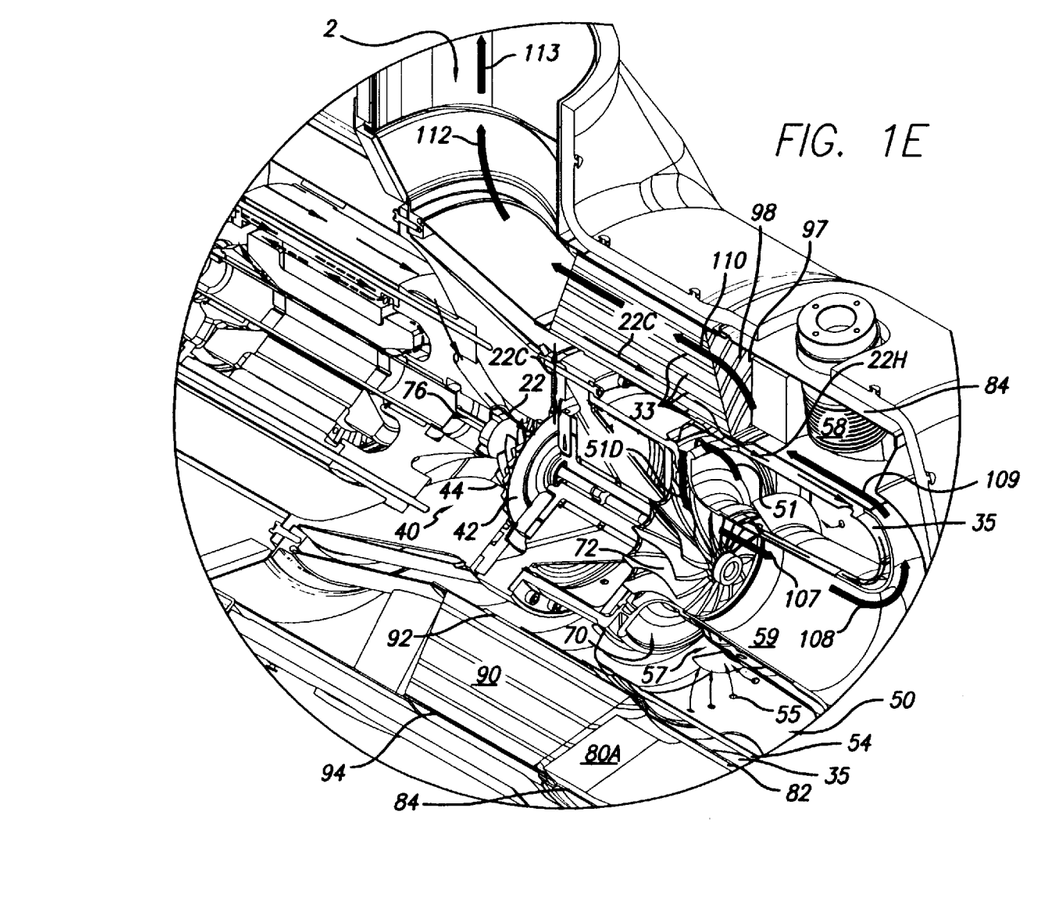
FIG. 1E is a magnified perspective view, partially in section, of the compressor-turbine portion of the integrated turbogenerator of FIG. 1A.

Referring to FIG. 1E, compressor 40 may include compressor impeller 42 and compressor impeller housing 44. Recuperator 90 may have an annular shape defined by cylindrical recuperator inner wall 92 and cylindrical recuperator outer wall 94. Recuperator 90 contains internal passages for gas flow, one set of passages, passages 33 connecting from compressor 40 to combustor 50, and one set of passages, passages 97, connecting from turbine exhaust 80 to turbogenerator exhaust output 2.

Referring again to FIG. 1B and FIG. 1C, in one method of operation air flows into primary inlet 20 and divides into compressor air 22 and motor/generator cooling air 24. Motor/generator cooling air 24 flows into annular space 10A between motor/generator housing 16 and permanent magnet motor/generator stator 14 along flow path 24A. Heat is exchanged from stator cooling fins 18 to generator cooling air 24 in flow path 24A, thereby cooling stator cooling fins 18 and stator 14 and forming heated air 24B. Warm stator cooling air 24B exits stator heat exchanger 17 into stator cavity 25 where it further divides into stator return cooling air 27 and rotor cooling air 28. Rotor cooling air 28 passes around stator end 13A and travels along rotor or sleeve 12. Stator return cooling air 27 enters one or more cooling ducts 14D and is conducted through stator 14 to provide further cooling. Stator return cooling air 27 and rotor cooling air 28 rejoin in stator cavity 29 and are drawn out of motor/generator 10 by exhaust fan 11 which is connected to rotor or sleeve 12 and rotates with rotor or sleeve 12. Exhaust air 27B is conducted away from primary air inlet 20 by duct 10D.

Referring again to FIG. 1E, compressor 40 receives compressor air 22. Compressor impeller 42 compresses compressor air 22 and forces compressed air 22C to flow into set of passages 33 in recuperator 90 connecting compressor 40 to combustor 50. In passages 33 in recuperator 90, heat is transferred from walls 98 of recuperator 90 to compressed air 22C. As shown in FIG. 1E, heated compressed air 22H flows out of recuperator 90 into space 35 between cylindrical inner surface 82 of turbine exhaust 80 and cylindrical outer wall 54 of combustor 50. Heated compressed air 22H may flow into combustor 54 through side wall ports 55 or main inlet 57. Fuel (not shown) may be reacted in combustor 50 together with heated compressed air 22H to convert chemically stored energy to heat in the form of hot compressed gas 51. Hot compressed gas 51 in combustor 50 flows through turbine 70 forcing turbine wheel 72 to rotate. Movement of surfaces of turbine wheel 72 away from gas molecules partially cools and decompresses gas 51D moving through turbine 70. Turbine 70 is designed so that exhaust gas 107 flowing from combustor 50 through turbine 70 enters cylindrical passage 59. Partially cooled and decompressed gas in cylindrical passage 59 flows axially in a direction away from permanent magnet motor/generator section 10, then radially outward, and then axially in a direction toward permanent magnet motor/generator section 10 to passages 98 of recuperator 90, as indicated by gas flow arrows 108 and 109, respectively.

Low pressure catalytic reactor 80A may be included between fuel injector inlets 58 and recuperator 90. Low pressure catalytic reactor 80A may include internal surfaces (not shown) having catalytic material (e.g., Pd or Pt, not shown) disposed thereon. Low pressure catalytic reactor 80A may have a generally annular shape defined by cylindrical inner surface 82 and cylindrical low pressure outer surface 84. Unreacted and incompletely reacted hydrocarbons in gas flowing through low pressure catalytic reactor 80A react to convert chemically stored energy into additional heat, and to lower concentrations of partial reaction products such as harmful emissions including nitrous oxides (NOx). Gas 110 flows through passages 97 in recuperator 90 connecting from turbine exhaust 80 or catalytic reactor 80A to turbogenerator exhaust output 2, as indicated by gas flow arrow 112, and then exhausts from turbogenerator 1 as indicated by gas flow arrow 113. Gas flowing through passages 97 in recuperator 90 connecting from turbine exhaust 80 to outside of turbogenerator 1 transfers heat to walls 98 of recuperator 90. Walls 98 of recuperator 90 heated by gas flowing from turbine exhaust 80 exchange heat to gas 22C flowing in recuperator 90 from compressor 40 to combustor 50.

Air 22 may be replaced by a gaseous fuel mixture. In this embodiment, fuel injectors may not be necessary. Additionally, an air and fuel mixer may be provided upstream of compressor 40. Fuel may be conducted directly to compressor 40, such as by a fuel conduit connecting to compressor impeller housing 44. Fuel and air may be mixed by action of the compressor impeller 42. In this embodiment, fuel injectors may also not be necessary. Combustor 50 may be a catalytic combustor. Geometric relationships and structures of components may differ from those shown in FIG. 1A. Permanent magnet motor/generator section 10 and compressor/combustor section 30 may have low pressure catalytic reactor 80A disposed outside of annular recuperator 90, and may have recuperator 90 located outside of low pressure catalytic reactor 80A. Low pressure catalytic reactor 80A may be disposed at least partially in cylindrical passage 59, or in a passage of any shape confined by an inner wall of combustor 50. Combustor 50 and low pressure catalytic reactor 80A may be substantially or completely enclosed with an interior space formed by a generally annular recuperator 90, or a recuperator 90 shaped to substantially enclose both combustor 50 and low pressure catalytic reactor 80A on all but one face.

Figure 2:
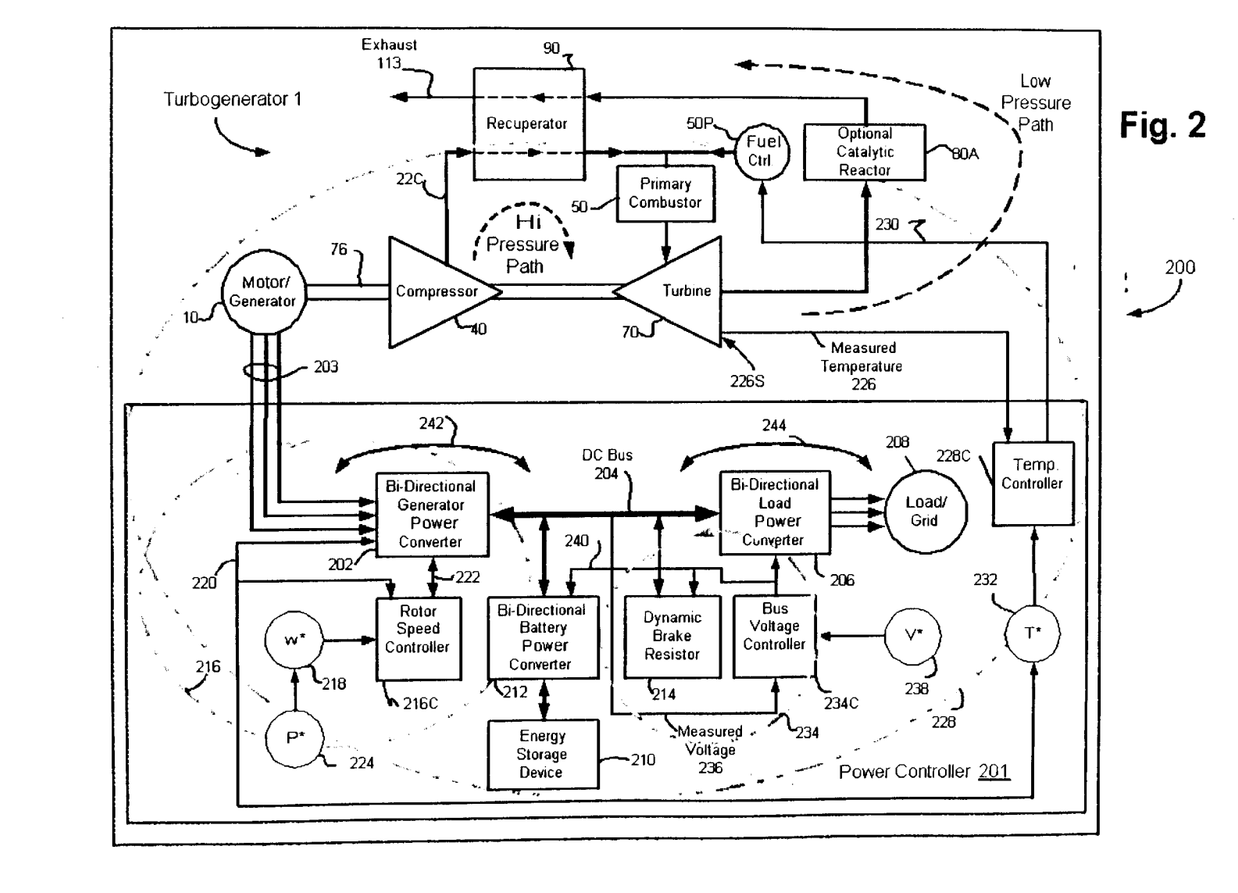
FIG. 2 is a block diagram schematic of a turbogenerator system including a power controller having decoupled rotor speed, operating temperature, and DC bus voltage control loops.

Referring to FIG. 2, turbogenerator system 200 includes integrated turbogenerator 1 and power controller 201. Turbogenerator 1 may further include various electrical sensor and control lines for providing feedback to power controller 201 and for receiving and implementing control signals. Power controller 201 includes three substantially decoupled control loops for controlling (1) rotary speed, (2) temperature, and (3) DC bus voltage. A more detailed description of an appropriate power controller is disclosed in parent U.S. patent application Ser. No. 09/207,817, filed on Dec. 8, 1998 in the names of Gilbreth, Wacknov and Wall, assigned to the assignee of the present application, and incorporated herein in its entirety by reference thereto.

Temperature control loop 228 regulates a temperature related to the desired operating temperature of primary combustor 50 to a set point by varying fuel flow from fuel control element 50P to primary combustor 50. Temperature controller 228C receives temperature set point T* from temperature set point source 232 and receives a measured temperature from temperature sensor 226S connected to measured temperature line 226. Temperature controller 228C generates and transmits a fuel control signal over fuel control signal line 230 to fuel pump 50P for controlling the amount of fuel supplied by fuel pump 50P to primary combustor 50 to an amount intended to result in a desired operating temperature in primary combustor 50. Temperature sensor 226S may directly measure the temperature in primary combustor 50 or may measure a temperature of an element or area from which the temperature in the primary combustor 50 may be inferred.

Speed control loop 216 controls speed of the shaft common to the turbine 70, compressor 40, and motor/generator 10, hereafter referred to as the common shaft, by varying torque applied by the motor generator to the common shaft. Torque applied by the motor generator to the common shaft depends upon power or current drawn from or pumped into windings of motor/generator 10. Bi-directional generator power converter 202 is controlled by rotor speed controller 216C to transmit power or current in or out of motor/generator 10, as indicated by bi-directional arrow 242. A sensor in turbogenerator 1 senses the rotary speed on the common shaft and transmits that rotary speed signal over measured speed line 220. Rotor speed controller 216 receives the rotary speed signal from measured speed line 220 and a rotary speed set point signal from a rotary speed set point source 218. Rotary speed controller 216C generates and transmits to generator power converter 202 a power conversion control signal on line 222 controlling generator power converter 202 to transfer power or current between AC lines 203 (i.e., from motor/generator 10) and DC bus 204. Rotary speed set point source 218 may convert a power set point P* received from power set point source 224 to the rotary speed set point.

Voltage control loop 234 controls bus voltage on DC bus 204 to a set point by transferring power or voltage between DC bus 204 and any of (1) Load/Grid 208 and/or (2) energy storage device 210, and/or (3) by transferring power or voltage from DC bus 204 to dynamic brake resistor 214. A sensor measures voltage DC bus 204 and transmits a measured voltage signal over measured voltage line 236 to bus voltage controller 234C, which further receives a voltage set point signal V* from voltage set point source 238. Bus voltage controller 234C generates and transmits signals to bi-directional load power converter 206 and to bi-directional battery power converter 212 to control their transmission of power or voltage between DC bus 204, load/grid 208, and energy storage device 210, respectively. In addition, bus voltage controller 234 transmits a control signal to control connection of dynamic brake resistor 214 to DC bus 204. Power controller 201 regulates temperature to a set point by varying fuel flow, adds or removes power or current to motor/generator 10 under control of generator power converter 202 to control rotor speed to a set point as indicated by bi-directional arrow 242, and controls bus voltage to a set point by (1) applying or removing power from DC bus 204 under the control of load power converter 206 as indicated by bi-directional arrow 244, (2) applying or removing power from energy storage device 210 under the control of battery power converter 212, and (3) by removing power from DC bus 204 by modulating the connection of dynamic brake resistor 214 to DC bus 204.

To protect the temperature limits of turbogenerator 1, TET is measured and controlled to a temperature limit selected to protect the metal properties of the turbine and recuperator, and to prevent the turbogenerator from surging. This TET limit is active during all aspects of operation of the turbogenerator—starting, steady state operation, acceleration, and deceleration.

Recuperator 90 stores a significant amount of energy as a result of it thermal mass. This energy must be dissipated during an offload (i.e. a reduction in the power output demanded of the turbogenerator). Turbogenerator system 200 dissipates this energy by significantly reducing the fuel flow, which reduces the output power of the turbogenerator. As described above, turbogenerator system 200 employs a unique strategy of decoupling the turbogenerator speed control loop from the TET control loop wherein the generator control system regulates the speed of the turbogenerator while the fuel control system independently regulates the TET of the turbogenerator.

During an offload, a significant amount of fuel flow energy must be dissipated to compensate for the stored energy in the recuperator. To prevent the turbogenerator from flaming out during the offload, a minimum fuel limit is incorporated. The minimum fuel limit may be a calculated prediction of the combustion stability limit plus a margin, as a function of several turbogenerator parameters including turbogenerator speed, ambient temperature, and ambient pressure. The minimum fuel limit prediction may be based on a combination of turbogenerator testing and thermodynamic characteristics calculated based on ambient conditions. The minimum fuel limit may also include a fuel flow margin to account for turbogenerator variation, turbogenerator deterioration, fuel system variation, fuel energy variation, and sensor variation. To produce low emissions, the turbogenerator should be operated in a lean condition near its flame-out limit. This requires that the minimum fuel limit be accurate. If the minimum fuel limit is too low, the turbogenerator may flame-out. If the minimum fuel limit is too high, the turbogenerator may exceed the TET limit.

Thus, in one method of operating a turbogenerator during a transient offload in a lean condition while preventing flame-out, the TET set point is temporarily increased. This temporary increase in TET is allowable because recuperator and turbine damage occur as a result of sustained high temperatures and thus, if the TET is lowered to below the safe limit within a predetermined period of time, damage to the turbogenerator is avoided. By raising the TET set point, temperature control loop 228 modulates fuel flow to a higher flow rate that avoids flame-out. The TET is a function of the heat energy released by the fuel in combustion and the heat added to the combustion air in the recuperator. As the heat stored in the recuperator is dissipated, temperature control loop 228 gradually increases fuel flow to maintain the new, higher TET set point, and thus maintains combustion in combustor 50 above the flame-out limit.

Figure 3:
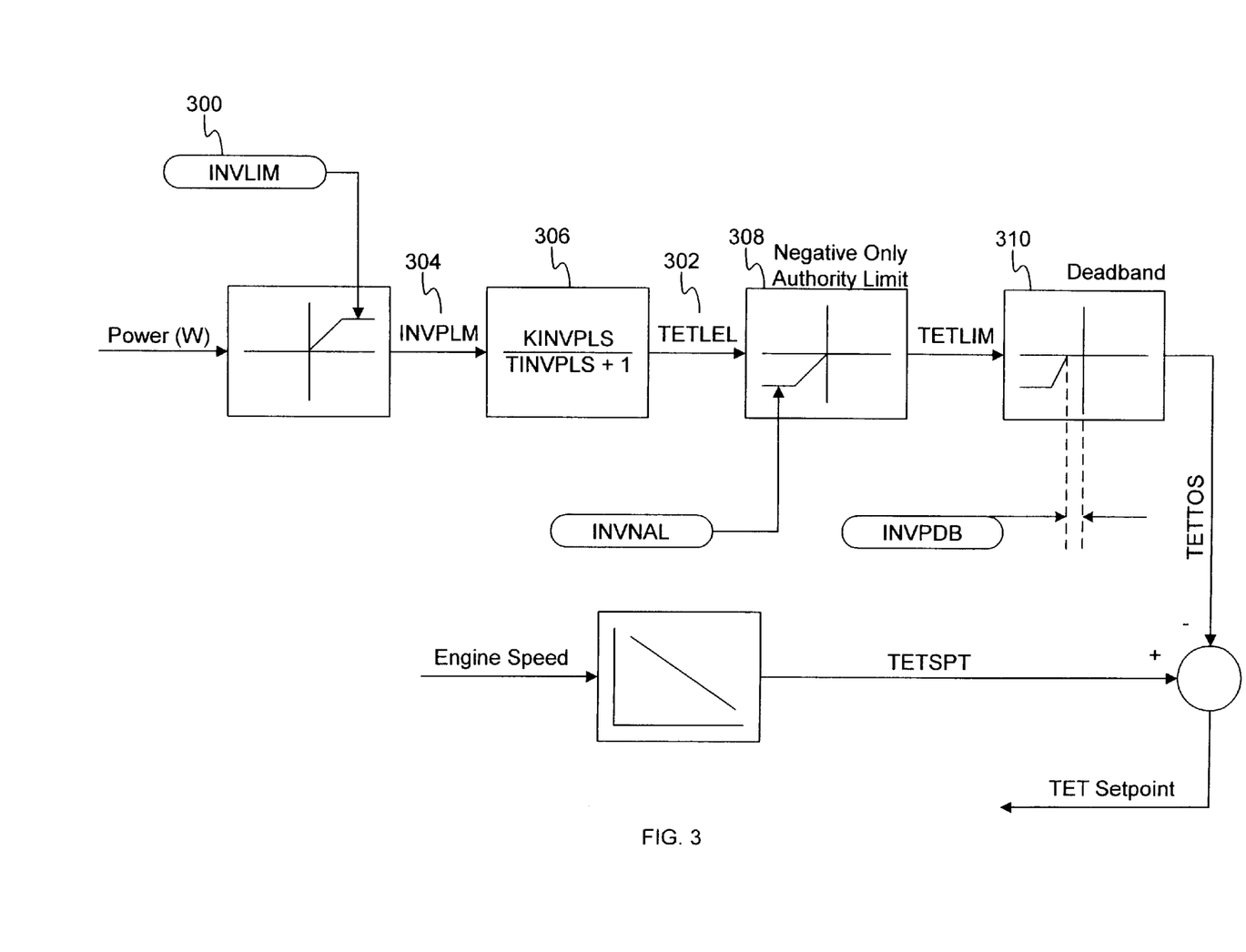
FIG. 3 is a diagram of the transient TET control.

Referring to FIG. 3, the power output of turbogenerator 1 is measured by controller 201. The transient TET control is only required at low power conditions and thus input to the logic is limited by input INVLIM 300. Transient TET offset TETLEL 302 is calculated from limited power input INVPLM 304 using lead-lag function 306. Lead lag function 306 is shown in Laplace domain format in FIG. 3, wherein KINVPL is the derivative gain and TINVPL is the time constant. The time constant may be on the order of several minutes and may be matched to the recuperator dynamics to maximize combustion stability during and after the offload. Negative only authority limit TETLIM 308 allows the control logic to be active for an offload condition (i.e. reduction in power) only. The limit may be based on the maximum allowable transient TET limit.

Deadband INVPDB 310 prevents TET transient offset 302 from affecting TET setpoint 312 while operating at steady-state conditions. The output of deadband 310, TET-TOS 314, is added to TET setpoint TETSPT 316. As the recuperator energy is dissipated after an offload (due to the reduction in thermal energy), the fuel flow increases gradually over time to maintain TET setpoint 316. The transient TET logic automatically reduces TET setpoint 316 as a function of time to offset the reduction in stored thermal energy, maximizing the fuel flow and associated combustion stability during the transient.

Having now described the invention in accordance with the requirements of the patent statutes, those skilled in the art will understand how to make changes and modifications to the disclosed embodiments to meet their specific requirements or conditions. Such changes and modifications may be made without departing from the scope and spirit of the invention, as defined and limited solely by the following claims.

What is claimed is:

1. A method for controlling a turbogenerator, comprising:
   operating the turbogenerator at a selected speed to provide a selected amount of power;
   providing fuel to the turbogenerator to maintain a turbine exhaust temperature at a first selected value;
   reducing the turbogenerator speed to provide a reduced amount of power;
   providing fuel to the turbogenerator to maintain the turbine exhaust temperature at a second selected value higher than the first selected value for a selected period of time; and
   gradually increasing the amount of fuel provided to the turbogenerator over the selected period of time to maintain the turbine exhaust temperature at the second selected value.

2. The method of claim 1, wherein reducing the turbogenerator speed comprises:
   reducing the turbogenerator speed to provide a reduced amount of power in response to a reduction in power demand.

3. The method of claim 2, wherein reducing the turbogenerator speed comprises:
   reducing the turbogenerator speed to provide a reduced amount of power in response to a specified reduction in the power demand.

4. A method for controlling a turbogenerator, comprising:
   operating the turbogenerator at a selected speed to provide a selected amount of power;
   providing fuel to the turbogenerator to maintain a turbine exhaust temperature at a first selected value;
   reducing the turbogenerator speed to provide a reduced amount of power, wherein reducing the turbogenerator speed comprises reducing the turbogenerator speed to provide a reduced amount of power in response to a reduction in power demand;
   providing fuel to the turbogenerator to maintain the turbine exhaust temperature at a second selected value higher than the first selected value for a selected period of time; and
   prior to reducing the turbogenerator speed, allowing a specified period of time to lapse after the reduction in the power demand.

5. The method of claim 4, wherein reducing the turbogenerator speed comprises:
   reducing the turbogenerator speed to provide a reduced amount of power in response to a specified reduction in the power demand.

6. A method for controlling a turbogenerator, comprising:
   operating the turbogenerator at a selected speed to provide a selected amount of power;
   providing fuel to the turbogenerator to maintain a turbine exhaust temperature at a first selected value;
   reducing the turbo generator speed to provide a reduced amount of power; and
   providing fuel to the turbogenerator to maintain the turbine exhaust temperature at a second selected value higher than the first selected value for a selected period of time,
   wherein the period of time is selected in accordance with characteristics of a heat recuperator associated with the turbogenerator.

* * * * *